US006702207B2

(12) United States Patent
Seelbach et al.

(10) Patent No.: US 6,702,207 B2
(45) Date of Patent: Mar. 9, 2004

(54) FUEL INJECTOR CONTROL MODULE WITH UNIDIRECTIONAL DAMPENING

(75) Inventors: Klaus Seelbach, Grand Rapids, MI (US); Todd R. Foote, Wayland, MI (US); Randall C. Harkema, Caledonia, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/196,894

(22) Filed: Jul. 16, 2002

(65) Prior Publication Data

US 2004/0011888 A1 Jan. 22, 2004

(51) Int. Cl.[7] .......................... B05B 1/30; F02M 51/00; F16K 31/12
(52) U.S. Cl. ................. 239/585.1; 239/585.4; 239/585.5; 239/533.2; 239/89; 251/48; 251/129.09
(58) Field of Search .......................... 239/585.1, 585.4, 239/585.5, 533.2, 89, 88, 91, 533.9, 533.3; 251/48, 129.09, 54

(56) References Cited

U.S. PATENT DOCUMENTS

| 4,957,275 | A |   | 9/1990  | Homes |
| 5,033,716 | A | * | 7/1991  | Mesenich ............... 251/129.21 |
| 5,118,076 | A |   | 6/1992  | Homes |
| 5,139,224 | A | * | 8/1992  | Bright ........................ 251/50 |
| 5,375,576 | A | * | 12/1994 | Ausman et al. ............. 123/446 |
| 5,651,501 | A | * | 7/1997  | Maley et al. ................. 239/88 |
| 5,893,516 | A |   | 4/1999  | Harcombe et al. |
| 6,168,091 | B1| * | 1/2001  | Rodier et al. ................. 239/88 |
| 6,467,391 | B2| * | 10/2002 | Desai et al. .................. 91/398 |

FOREIGN PATENT DOCUMENTS

WO    WO 02/31342 A1    4/2002

* cited by examiner

Primary Examiner—Michael Mar
Assistant Examiner—Darren Gorman
(74) Attorney, Agent, or Firm—Brooks Kushman P.C.

(57) ABSTRACT

Fluid in a chamber, through which a fuel control armature is moving, is used to dampen armature vibrations. This dampening effect is achieved by forming a passage through which the fluid flows as the actuator moves to a steady state position. This passage may be implemented in a control module for controlling fuel delivery in a fuel injector. The control module includes a control module housing defining the cavity. The armature is disposed at least partially within the cavity. The armature affects the flow of fuel in the injector by changing the area of a fuel port through which fuel passes. The fluid passage is formed as the armature moves towards a contact wall defining the cavity.

1 Claim, 9 Drawing Sheets

FUEL INJECTOR CONTROL MODULE WITH UNIDIRECTIONAL DAMPENING

BACKGROUND OF THE INVENTION

1. Field of the Invention

The present invention relates to controlling the flow of fuel through an injector.

2. Background Art

Fuel injectors provide controlled pulses of fuel for combustion in internal combustion engines. The flow of fuel through a fuel injector may be controlled by one or more solenoids that open ports, close ports, or otherwise affect the flow of fuel within the fuel injector through movement of an armature. Typically, each solenoid armature is biased in a first position by a mechanical spring and activated to a second position by a motive force provided by a solenoid electromagnet. When the motive force is removed, the spring returns the solenoid armature to its deactivated position. This deactivation results in ringing of the armature or other mechanical vibrations due to contact with a mechanical stop. Such vibrations interfere with or otherwise complicate the control of fuel flowing through the injector and may shorten the effective injector life.

What is needed is to minimize ringing and other vibrations caused by deactivation of a control solenoid within a fuel injector.

SUMMARY OF THE INVENTION

The present invention utilizes a fluid in a chamber, through which a fuel control armature is moving, to dampen armature vibrations. This dampening effect is achieved by forming a passage through which the fluid flows as the actuator moves to a deactivated or steady state position.

A control module for controlling fuel delivery in a fuel injector is provided. The control module includes a control module housing defining a cavity. An armature is disposed at least partially within the cavity. The armature affects the flow of fuel by changing the area of a fuel port through which fuel passes. The control module includes a drive for moving the armature towards a contact wall of the cavity. The drive may include mechanical elements, such as a spring, electromagnetic elements, hydraulic elements, and the like. A fluid passage is formed as the armature moves towards the contact wall. The fluid passage remains open to pass a minimum volume of fluid when the armature contacts the contact wall. Vibrations in the armature are dampened by the fluid as fluid moves through the passage.

In an embodiment of the present invention, the fluid passage is formed by a dampener sleeve extending from the armature towards the contact wall. A stop may extend from the armature towards the contact wall farther than the dampener sleeve such that, when the stop contacts the wall, the fluid passage forms a minimum passage gap between the dampener sleeve and the contact wall. Alternatively, or in addition to the gap provided by the stop, the fluid passage may be formed by at least one notch or hole in the dampener sleeve.

In another embodiment of the present invention, the fluid passage is formed by a channel in the contact wall.

In yet another embodiment of the present invention, the fluid passage is formed between a dampener shim on the contact wall and a compression side of the armature. The compression side may be circular and the dampener shim may define a circular opening having an opening radius smaller than the compression side radius. A stop may extend from the compression side towards the contact wall a distance greater than the thickness of the dampener shim.

In still another embodiment of the present invention, the armature defines a shoulder at least partially around the armature. The fluid passage is formed between a dampener sleeve extending from the contact wall and the shoulder.

In a further embodiment of the present invention, the control module may define a second cavity within which is at least partially disposed a second armature. The second armature forms a second fluid passage. Fluid exiting the second armature cavity through the second fluid passage provides dampening of the second armature.

A method of controlling a flow of fuel in a fuel injector is also provided. At least a portion of an armature in a cavity containing fluid is moved. An opening area of a fuel port changes through the movement of the armature to affect the flow of fuel. A fluid passage for passing fluid between the armature and a wall defining the cavity is formed as the armature moves into contact with the wall. Fluid pressure increases as the fluid passage forms to dampen armature vibration.

A fuel injector is also provided. The fuel injector includes an injector body defining a fuel outlet. A fuel delivery path delivers pressurized fuel to the outlet. A control module connected to the fuel delivery path has at least one solenoid for controlling fuel delivery. Each solenoid has an armature biased by a spring to contact a wall defining a cavity when the solenoid is not energized. The armature and the wall form a passage as the armature approaches the wall. This passage passes fluid from between the armature and the wall into the remaining cavity to dampen vibrations caused by the armature contacting the wall.

A method of injecting fuel into an engine is also provided. The fuel is compressed. The compressed fuel is supplied to an opening in an injector through a controlled path. A solenoid in the injector is activated to control the flow of fuel along the path. The solenoid has an armature traveling through a fluid containing cavity. The solenoid, when deactivated, allows the armature to contact a wall defining the cavity. A passage is formed as the armature contacts the wall. Fluid is passed from between the armature and the wall resulting in dampened vibrations.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
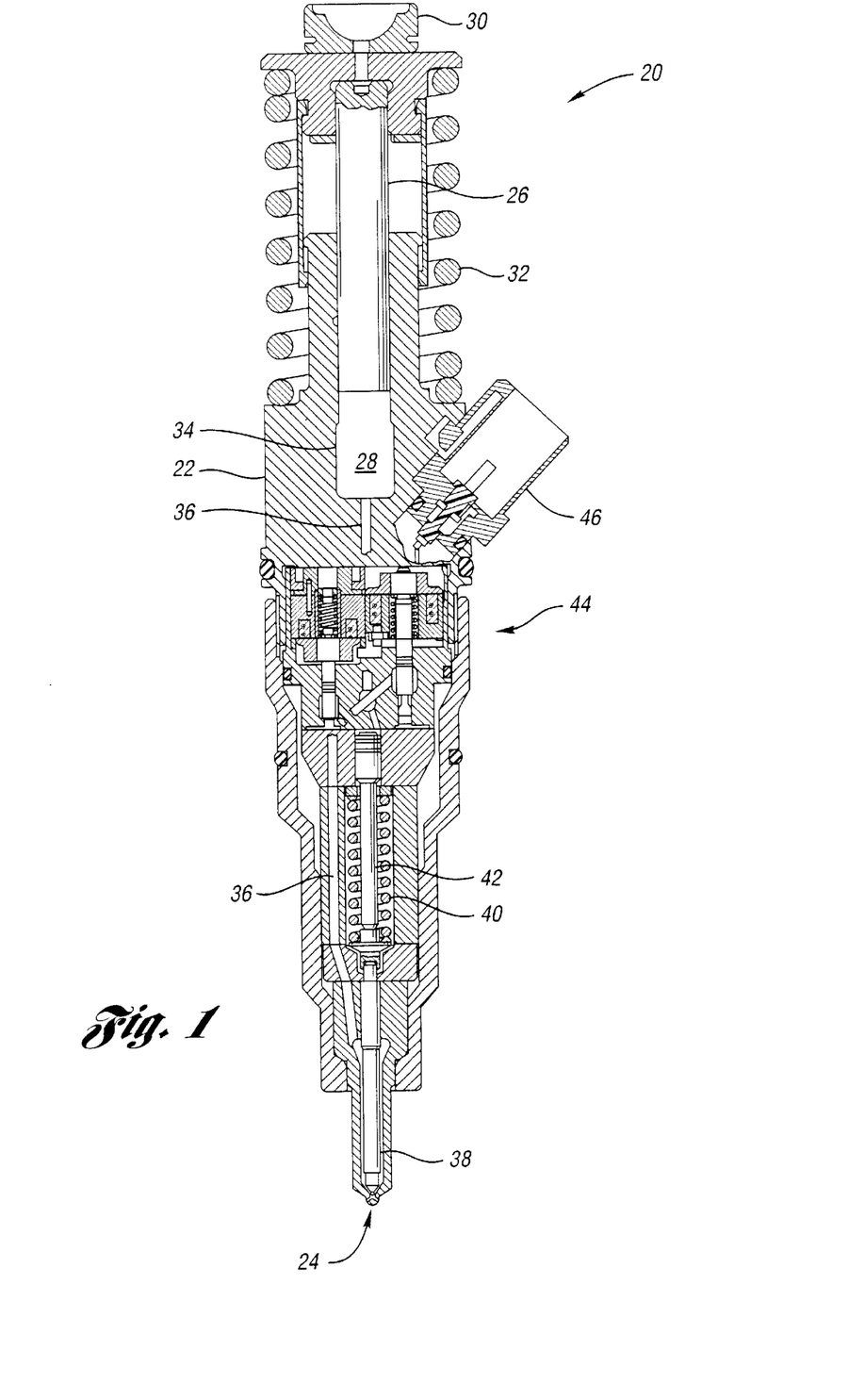
FIG. 1 is a conceptualized cut view drawing of a fuel injector which may incorporate the present invention.

Referring to FIG. 1, a conceptualized cut view drawing of a fuel injector which may incorporate the present invention is shown. A fuel injector, shown generally by 20, includes injector body 22 defining a fuel outlet shown generally by 24. Plunger 26 disposed within injector body 22 pressurizes fuel 28 due to an external force applied to cam cup 30 overcoming bias force supplied by plunger spring 32. Fuel 28 in reservoir 34 is routed to fuel outlet 24 through fuel delivery path 36.

Nozzle needle 38 is biased by needle spring 40 around load pin 42 to seal off fuel outlet 24. Pressurized fuel 28 from reservoir 34 is routed through fuel delivery path 36 to fuel outlet 24. Pressurized fuel 28 pushes nozzle needle 38 back, opening fuel outlet 24 to permit the escape of fuel 28 from fuel injector 20. The flow of fuel along fuel delivery path 36 to fuel outlet 24 is controlled by control module 44 having at least one solenoid for controlling fuel delivery. As will be described in greater detail below, each solenoid has an armature biased by a spring to contact a wall defining a cavity when the solenoid is not energized by a signal from electrical connector 46. The armature and the wall form a passage as the armature approaches the wall. The passage passes fluid from between the armature and the wall into the remaining cavity to dampen armature vibrations.

Figure 2:
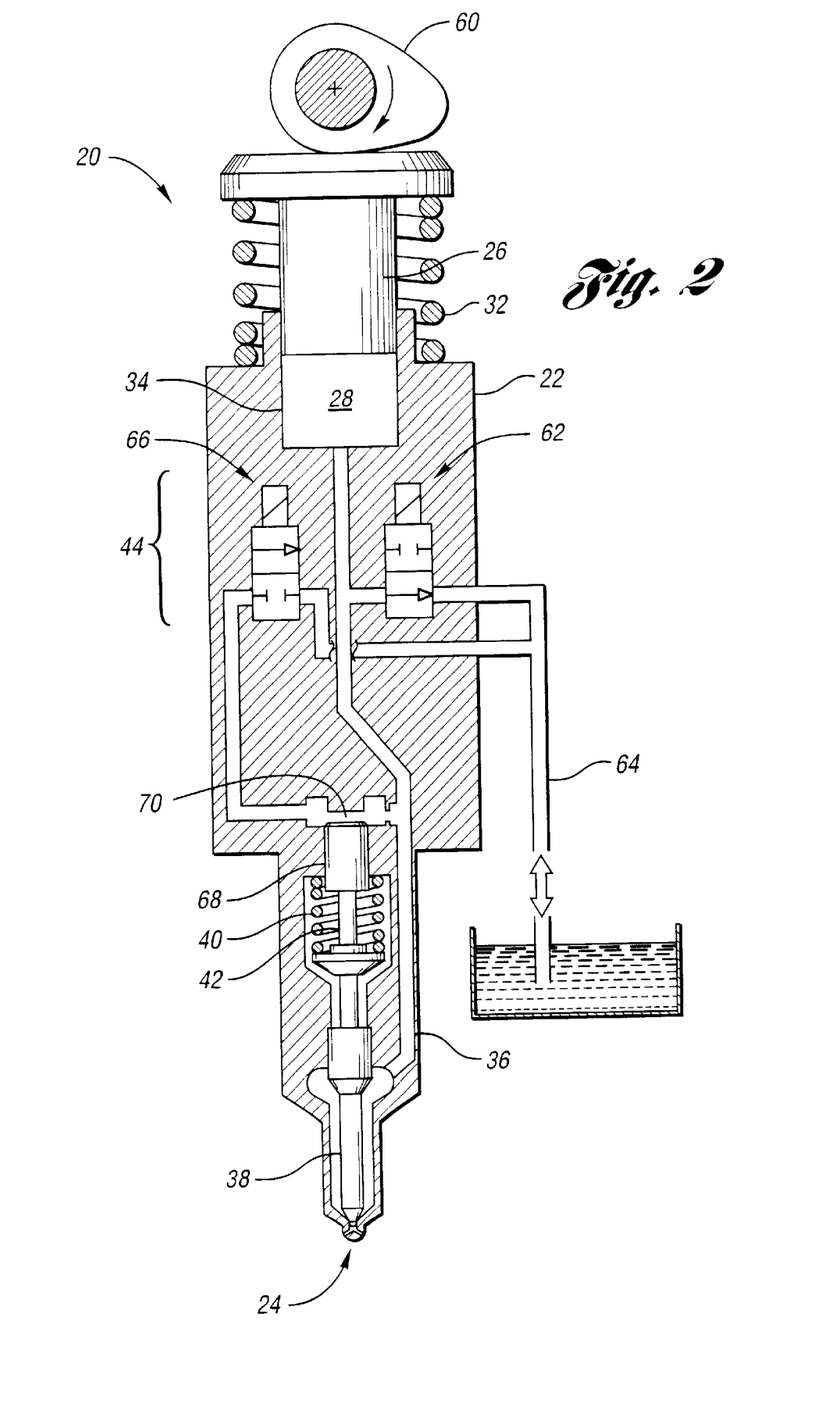
FIG. 2 is a schematic diagram illustrating the operation of a fuel injector which may incorporate the present invention.

Referring now to FIG. 2, a schematic diagram illustrating the operation of a fuel injector which may incorporate the present invention is shown. As cam 60 rotates, plunger 26 pressurizes fuel 28 in reservoir 34. Main control valve 62 in control module 44 is normally open, allowing fuel from reservoir 34 to dump through main control valve 62 into low pressure circuit 64. Control module 44 also includes normally closed needle control valve 66. Load pin 42 includes piston 68 in chamber 70. Chamber 70 fills from fuel delivery path 36 and empties through needle control valve 66 into low pressure circuit 64. When needle control valve 66 is not energized, pressurized fuel 28 within chamber 70 prevents nozzle needle 38 from opening fuel outlet 24. Thus, by controlling main control valve 62 and needle control valve 66, the shape of a fuel pulse exiting fuel outlet 24 may be controlled.

FIGS. 3, 4, and 6–8 illustrate various embodiments of the present invention with cross-sectional views of control modules having a main control valve and a needle control valve. Various techniques for dampening vibrations may be applied to either or both of the main control valve and the needle control valve. Further, as will be recognized by one of ordinary skill in the art, the present invention applies to a wide variety of valves for controlling the flow of fuel within a fuel injector.

Figure 3:
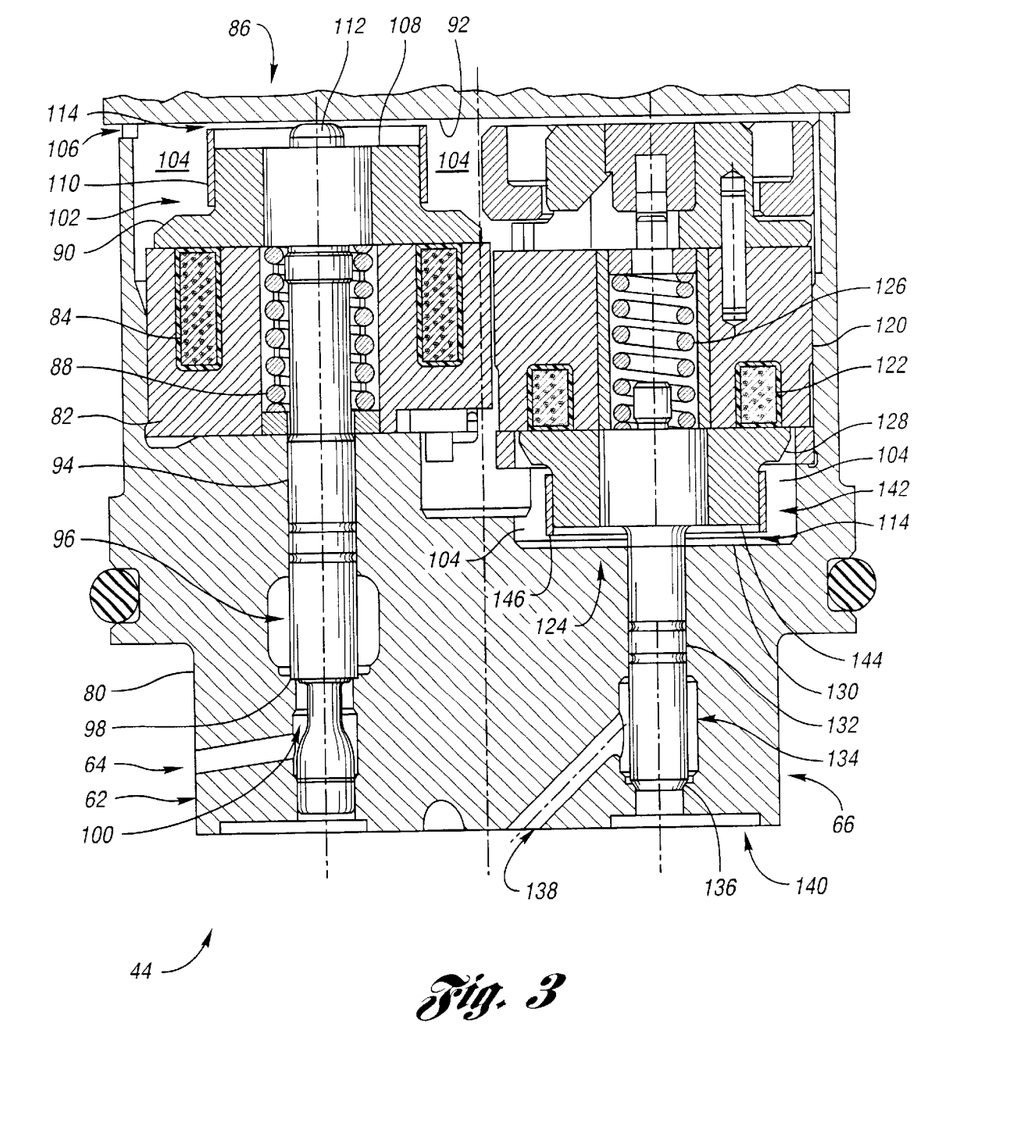
FIG. 3 is a cut view drawing of a control module having a dampener sleeve according to an embodiment of the present invention.

Referring now to FIG. 3, a cut view drawing of a control module having a dampener sleeve according to an embodiment of the present invention is shown. Control module 44 includes normally open main control valve 62 and normally closed needle control valve 66. The operation of both valves 62, 66 is similar. Each valve 62, 66 is implemented as an electromagnetic solenoid with an armature that moves to open or close a fuel flow port. As will be recognized by one skilled in the art, the present invention applies to valves or ports driven by any means.

Main control valve 62 is defined within control module housing 80. Stator block 82 is fixed within control module housing 80. Stator block 82 includes stator coil 84 which, when carrying sufficient current, activates main control valve 62. Main control valve 62 also includes an armature, shown generally by 86. Armature 86 is biased away from stator coil 84 by spring 88 pushing against flange 90. Thus, when main control valve 62 is deactivated, flange 90 is pushed by spring 88 towards contact wall 92 of control module housing 80. In the embodiment shown, contact wall 92 of housing 80 is formed by an interior portion of injector body 22.

Flange 90 is constructed of a magnetically attractable material such that, when stator coil 84 is energized, flange 90 is pulled against the force of spring 88 onto stator block 82. Shaft 94 is attached to flange 90. Shaft 94 passes through chamber 96 which is connected to high pressure fuel delivery path 36 via a port not shown. When main control valve 62 is energized, shaft 94 is hard against seat 98, sealing chamber 96 from fuel outlet 100. When main control valve 62 is not energized, spring 88 pulls shaft 94 away from seat 98 allowing fuel to pass from chamber 96 out through fuel outlet 100 to low pressure circuit 64.

Control module housing 80 defines cavity 102 through which passes flange 90 of armature 86. Cavity 102 is filled with fluid 104. Fluid 104 in cavity 102 in the embodiment shown is low pressure fuel. However, fluid 104 may be any fluid capable of dampening vibrations. Port 106 allows fluid 104 to escape cavity 102.

Prior to the present invention, de-energizing main control valve 62 caused spring 88 to force compression side 108 of flange 90 against contact wall 92. Flange 90 would bounce off contact wall 92 creating ringing and other vibrations. One problem with such ringing is a rapid opening and closing of chamber 96 to fuel outlet 100, decreasing the ability for main control valve 62 to precisely control the flow of fuel 28. In addition, vibrations decrease the effective life of fuel injector 20.

The present invention utilizes fluid 104 exiting through a passage formed as armature 86 moves towards contact wall 92 to dampen vibrations in armature 86. In the embodiment shown in FIG. 3, dampener sleeve 110 extends from flange 90 towards contact wall 92. Stop 112 also extends from armature 86. Stop 112 extends farther towards contact wall 92 than dampener sleeve 110 such that, when stop 112 contacts contact wall 92, fluid passage 114 is formed between dampener sleeve 110 and contact wall 92. As will be recognized by one skilled in the art, stop 112 may also extend from contact wall 92 towards contact flange 90 or shaft 94.

Dampener sleeve 110 may be formed from any suitable material such as, for example, steel. Dampener sleeve 110 may be press fit over flange 90, may be spot welded to flange 90, or may be attached by any other suitable means. Dampener sleeve 110 may also be formed as part of flange 90. Stop 112 is also preferably steel and may be formed as part of shaft 94, may be attached to shaft 94, may be attached to flange 90, may be formed as part of flange 90, or the like. A typical throw for armature 86 is about 180 microns with resulting gap distance for fluid passage 114 between dampener sleeve 110 and contact wall 92 of about 20 microns.

Control module housing 80 also contains normally closed needle control valve 66. Stator block 120 is fixed within control module housing 80. Stator block 120 includes stator coil 122 for carrying electrical current. A needle control valve armature, shown generally by 124, is biased away from stator coil 122 by spring 126. Armature 124 includes flange 128 made of a magnetically attractable material. When stator coil 122 carries sufficient current, flange 128 is pulled back against stator block 120, compressing spring 126. When stator coil 122 is de-energized, spring 126 forces flange 128 towards contact wall 130. Shaft 132 is fixed to flange 128. Shaft 132 passes through chamber 134 and contacts seat 136 to seal fuel inlet 138 from fuel outlet 140. Energizing stator coil 122 pulls shaft 132 away from seat 136 allowing pressurized fuel 28 to flow through fuel inlet 138 into chamber 134 through fuel outlet 140 and into low pressure circuit 64.

Control module housing 44 defines cavity 142 through which moves flange 128. Cavity 142 contains fluid 104 which may be, for example, low pressure fuel. Flange 128 has compression side 144 facing contact wall 130. Dampener sleeve 146 extends from compression side 144 towards contact wall 130 a distance such that fluid passage 114 between dampener sleeve 146 and contact wall 130 remains open when shaft 132 is against seat 136. Fluid 104 is forced through fluid passage 114 formed as flange 128 moves towards contact wall 130. Fluid 104 serves to dampen vibrations of armature 124 when needle control valve port 66 is de-activated.

Figures 4, 5:
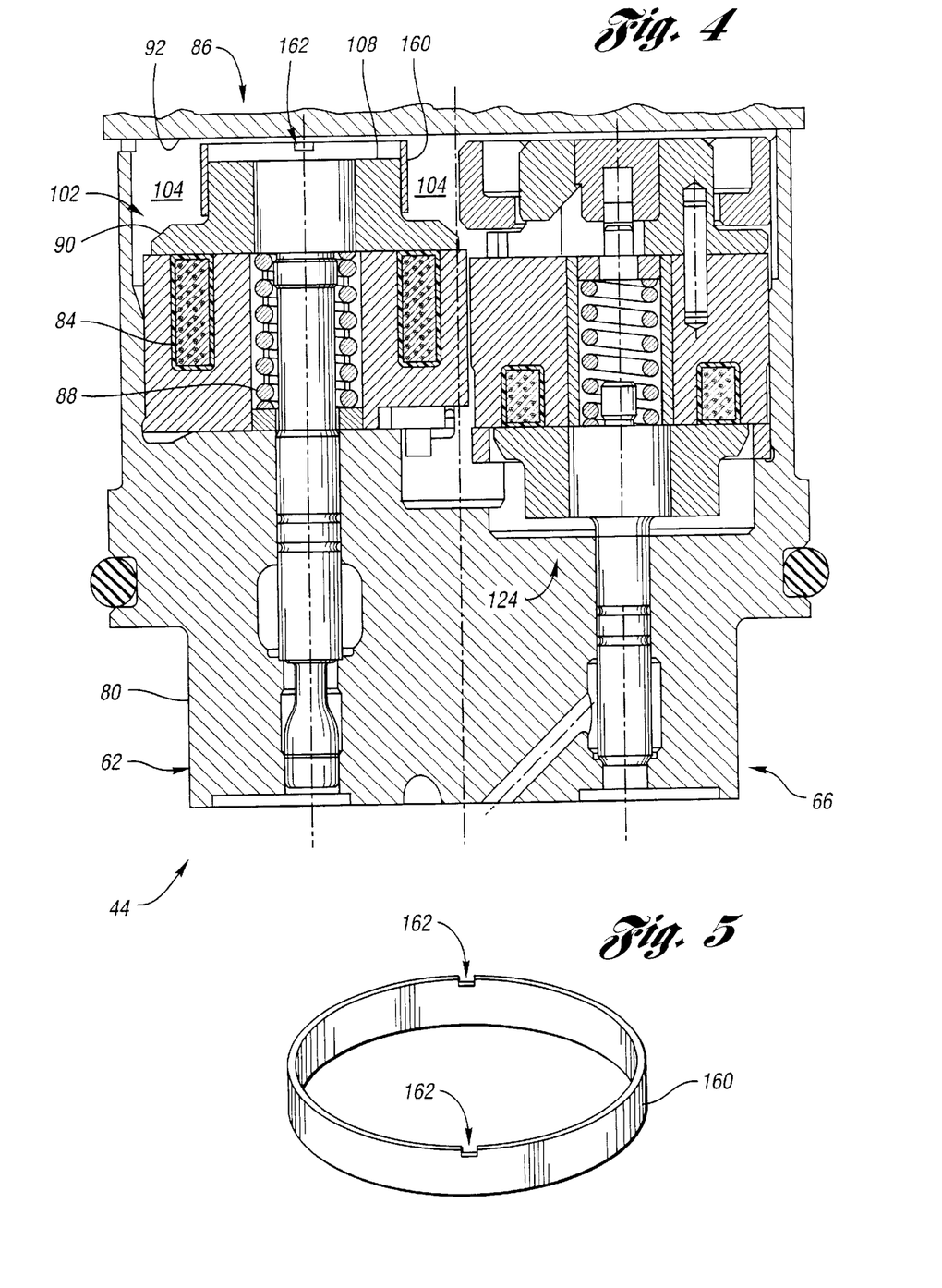
FIG. 4 is a cut view drawing of a control module having a notched dampener sleeve according to an embodiment of the present invention.
FIG. 5 is a perspective view drawing of a notched dampener sleeve according to an embodiment of the present invention.

Referring now to FIG. 4, a cut view drawing of a control module having a notched dampener sleeve according to an embodiment of the present invention is shown. Dampener sleeve 160 extends from flange 90 towards contact wall 92. When stator coil 84 is de-energized, spring 88 forces flange 90 towards contact wall 92 until dampener sleeve 160 strikes contact wall 92. Dampener sleeve 160 contains one or more notch 162 or similar opening. As dampener sleeve 160 approaches contact wall 92, notch 162 forms fluid passage 114 through which fluid 104 passes. Fluid 104, including fluid 104 escaping through fluid passage 114, dampens vibrations of armature 86.

Referring now to FIG. 5, a perspective view drawing of a notched dampener sleeve according to an embodiment of the present invention is shown. Dampener sleeve 160 is shown having two notches 162. As will be recognized by one of ordinary skill in the art, the number and size of notches 162 will depend on a variety of factors including the characteristics of fluid 104, the amount of dampening required for armature 86, the design of armature 86, the force applied to flange 90 by spring 88, and the like. Dampener sleeve 160 may be constructed of a variety of engineering materials such as, for example, steel. Dampener sleeve 160 may be press fit onto flange 90, may be spot welded, may be formed as part of flange 90, and the like.

Figure 6:
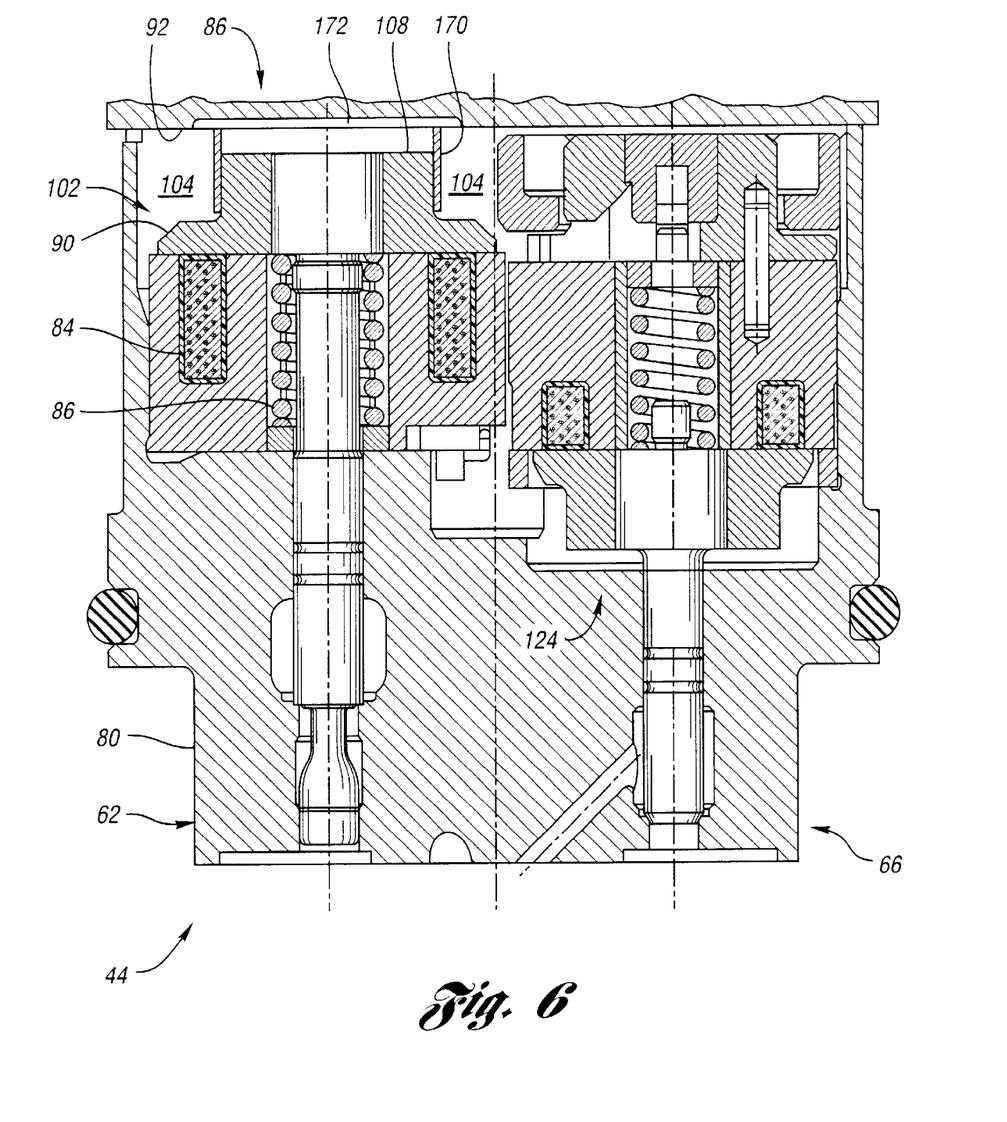
FIG. 6 is a cut view drawing of a control module defining a fluid passage channel according to an embodiment of the present invention.

Referring now to FIG. 6, a cut view drawing of a control module defining a fluid passage channel according to an embodiment of the present invention is shown. Dampener sleeve 170, similar in construction to dampener sleeve 160, extends from flange 90 towards contact wall 92. In this embodiment, dampener sleeve 170 may or may not include notches 162. Channel 172 is formed in contact wall 92 in a portion of contact wall 92 where dampener sleeve 170 contacts contact wall 92. As spring 88 forces flange 90 towards contact wall 92, channel 172 forms fluid passage 114 through which fluid 104 passes. Fluid 104 around flange 90 provides dampening of vibrations such as those caused when dampener sleeve 170 strikes contact wall 92.

Figure 7:
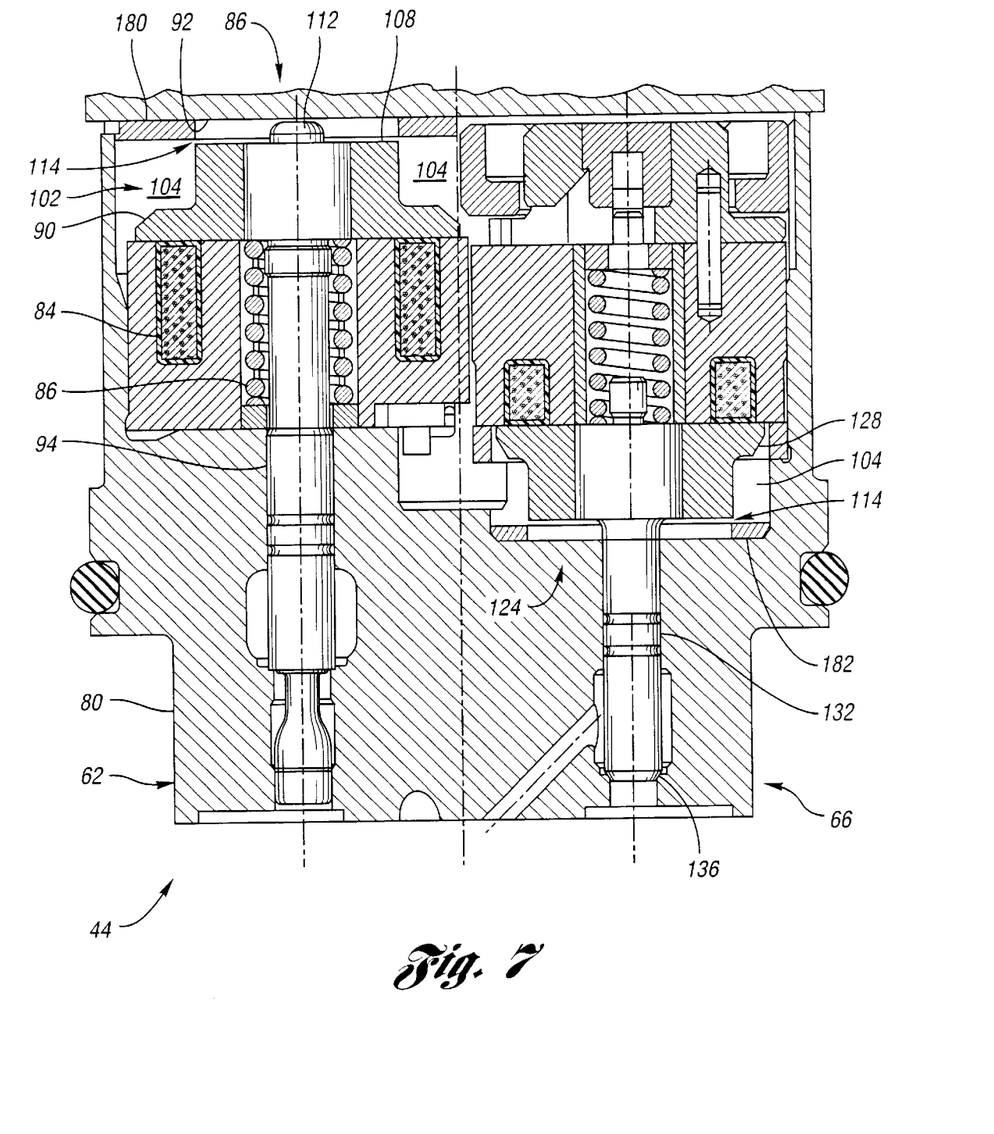
FIG. 7 is a cut view drawing of a control module with a dampener shim according to an embodiment of the present invention.

Referring now to FIG. 7, a cut view drawing of a control module with a dampener shim according to an embodiment of the present invention as shown. Control module 44 includes dampener shim 180 extending from contact wall 92. Fluid passage 114 is formed between dampener shim 180 and compression side 108 of flange 90 as flange 90 moves towards contact wall 92.

In an embodiment, compression side 108 is circular. Dampener shim 180 defines a circular opening with a radius smaller than the radius of compression side 108. Stop 112 extends from shaft 94 towards contact wall 92. When stator coil 84 is de-energized, spring 88 forces armature 86 towards contact wall 92. Stop 112 strikes contact wall 92 leaving fluid passage 114 open between flange 90 and dampener shim 180.

Dampener shim 182 in needle control valve 66 defines fluid passage 114 between flange 128 and dampener shim 182. The height of dampener shim 182 is adjusted such that passage 114 remains open when shaft 32 is against seat 136.

Figure 8:
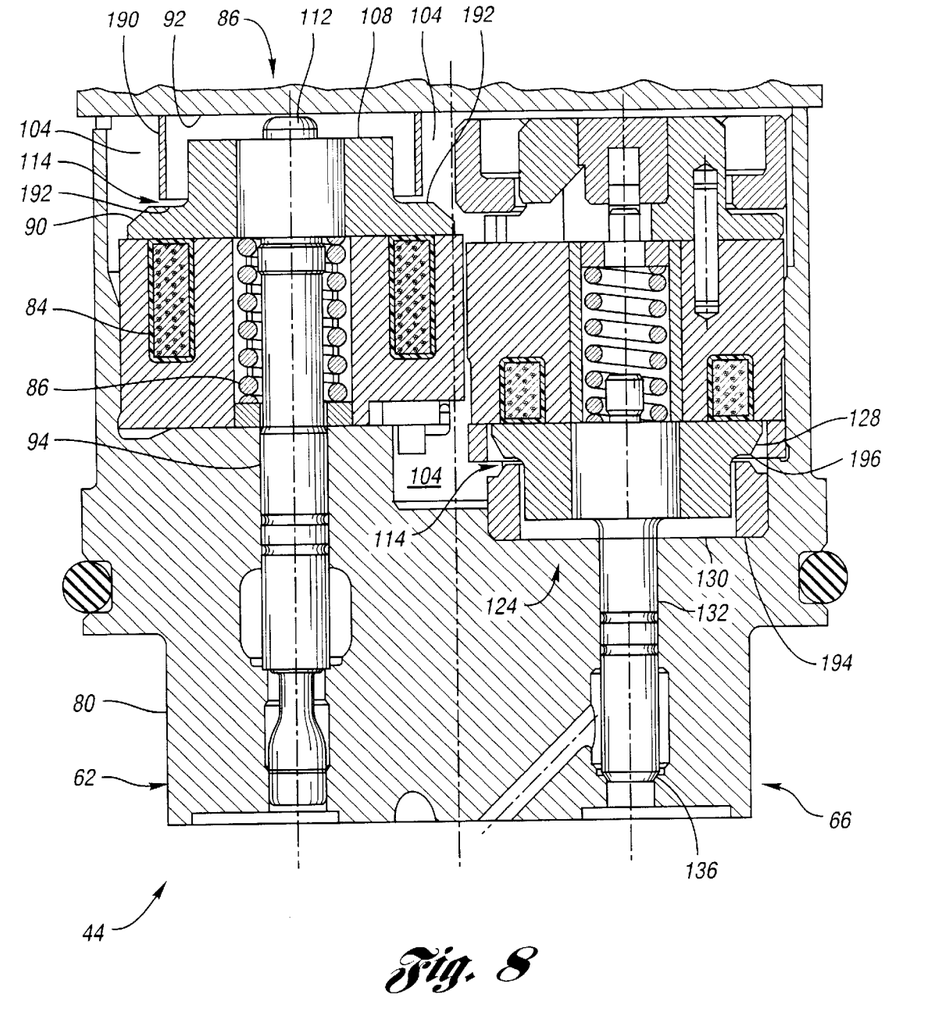
FIG. 8 is a cut view drawing of a control module with a dampener sleeve according to an embodiment of the present invention.

Referring now to FIG. 8, a cut view drawing of a control module with a dampener sleeve according to an embodiment of the present invention is shown. Dampener sleeve 190 extends from contact wall 92 towards flange 90. Fluid passage 114 is formed between shoulder 192 on flange 90 and dampener sleeve 190. Dampener sleeve 190 and flange 90 are designed such that stop 112 on shaft 94 contacts contact surface 92 leaving fluid passage 114 opened.

Dampener sleeve 194 extends from contact wall 130. Fluid passage 114 is formed between shoulder 196 on flange 128 and dampener sleeve 194 as flange 128 moves towards contact wall 130. Fluid passage 114 remains open when shaft 132 is seated on seat 136.

Figure 9:
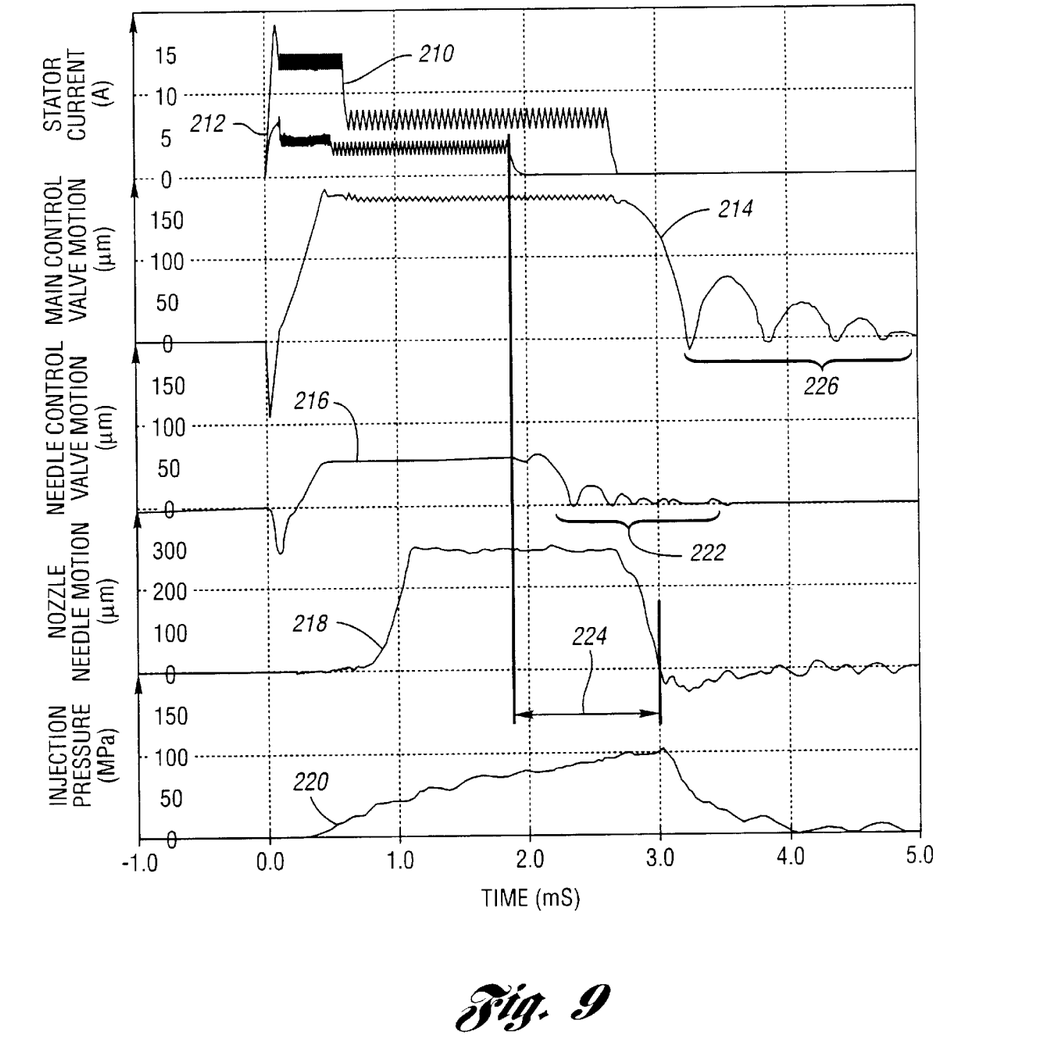
FIG. 9 is a plot of graphs illustrating control valve bouncing.

Referring now to FIG. 9, a plot of graphs illustrating control valve bouncing is shown. These graphs illustrate operation of fuel injector 20, such as described with regards to FIGS. 1 and 2, prior to the present invention. Plot 210 shows current applied to stator coil 84 of main control valve 62. Similarly, plot 212 shows stator current applied to coil 122 of needle control valve 66. Plot 214 shows the movement of armature 86 in main control valve 62 to close main control valve 62. Plot 216 shows the motion of armature 124 in needle control valve 66 to open needle control valve 66. Closing main control valve 62 and opening needle control valve 66 allows nozzle needle 38 to move so that fuel 28 escapes from fuel outlet 24 in fuel injector 20. The motion of nozzle needle 38 is shown in plot 218.

After approximately 1.8 milliseconds, current to stator 122 is switched off to close nozzle needle 38. Deactivating nozzle needle control valve 66 prior to the present invention causes compression side 144 of flange 128 to bounce off contact wall 130 causing ringing 222 in plot 216. Ringing 222 causes needle control valve 66 to bounce between an opened state and a closed state, creating extensive delay 224 between control signal 212 and the close of nozzle needle 38 as shown in plot 218. Turning off stator current 210 to stator coil 84 causes main control valve 62 to de-energize. Prior to the present invention, compression side 108 of flange 90 would bounce off contact wall 92 causing ringing 226 seen plot 214.

Figure 10:
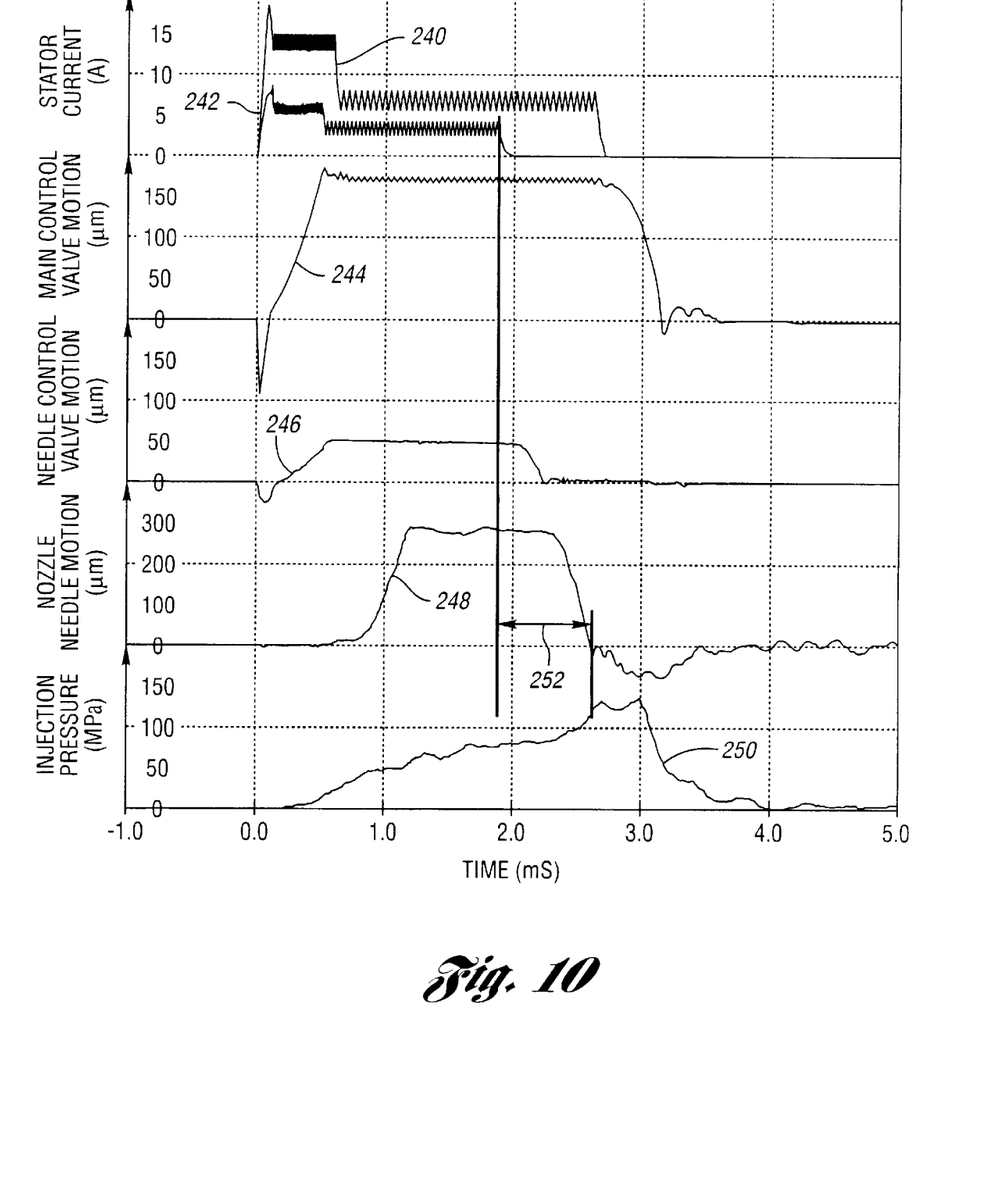
FIG. 10 is a plot of graphs illustrating vibration reduction due to an embodiment of the present invention.

Referring now to FIG. 10, a plot of graphs illustrating vibration reduction according to an embodiment of the present invention are shown. These graphs illustrate fuel injector 20 implementing dampening as described with regards to FIGS. 1–3. Plot 240 illustrates stator current for main control valve 62 and plot 242 illustrates stator current for needle control valve 66 substantially the same as the control currents 210 and 212, respectively, in FIG. 9. The movement of armature 86 in main control valve 62, shown by plot 244, exhibits greatly reduced ringing. The motion of armature 124 in needle control valve 66, illustrated by plot 246, shows no ringing whatsoever. The reduced vibrations in valves 62, 66 results in less delay, indicated by time 252, between control signal 242 to close nozzle needle 38 and the time which nozzle needle 38 actually closes. In addition, the greatly reduced ringing and vibration decreases the wear on elements within fuel injector 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling a flow of fuel in a fuel injector comprising:

moving at least a portion of an armature in a cavity containing fluid;

changing an opening area of a fuel port through the movement of the armature, thereby affecting the flow of fuel;

forming a fluid passage for passing fluid between the armature and a wall defining the cavity as the armature moves towards the wall, the fluid passage formed to have an opening distance less than a spacing between the armature and the wall, the fluid passage formed by moving a dampener sleeve extending from the armature in a direction of armature motion and contacting the wall defining the cavity with a stop extending from the armature in the direction of armature motion farther than the dampener sleeves;

increasing fluid pressure as the fluid passage forms; and dampening armature vibration through the increasing fluid pressure.

* * * * *